G. JEFFREY.
FURROW FILLER AND CULTIVATOR.
APPLICATION FILED JULY 23, 1917.
1,254,600.
Patented Jan. 22, 1918.
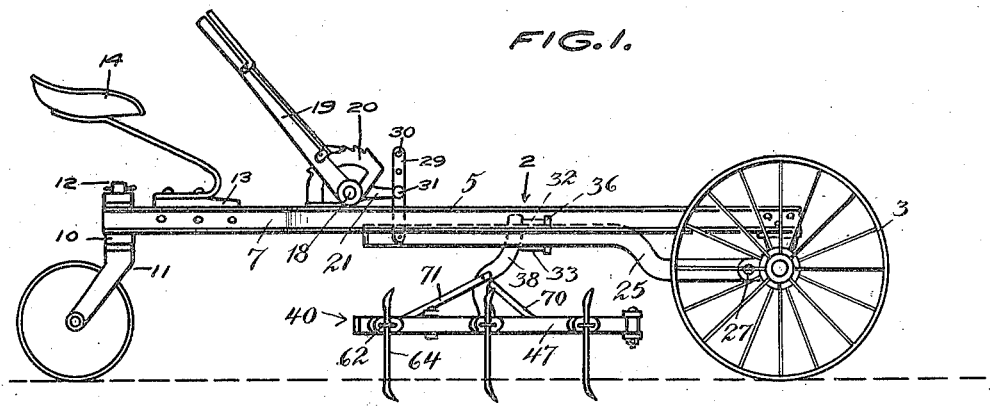
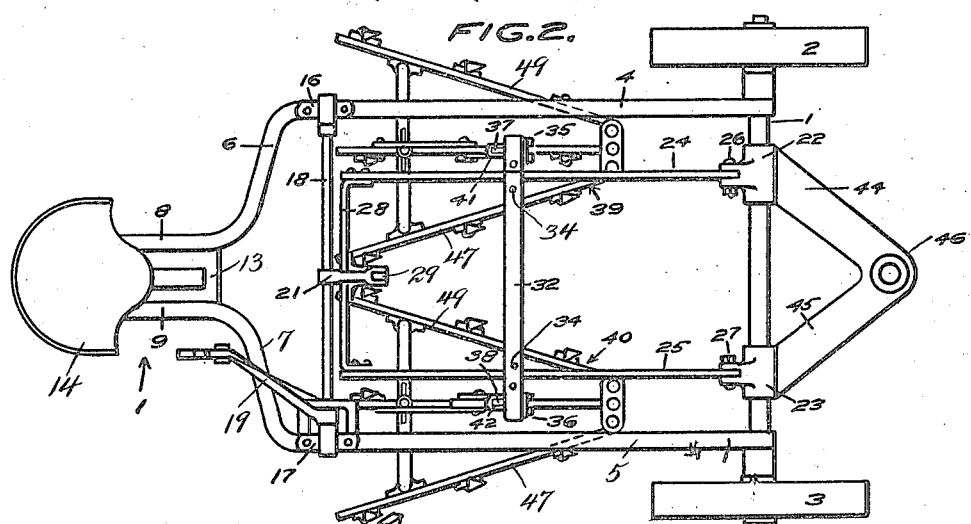
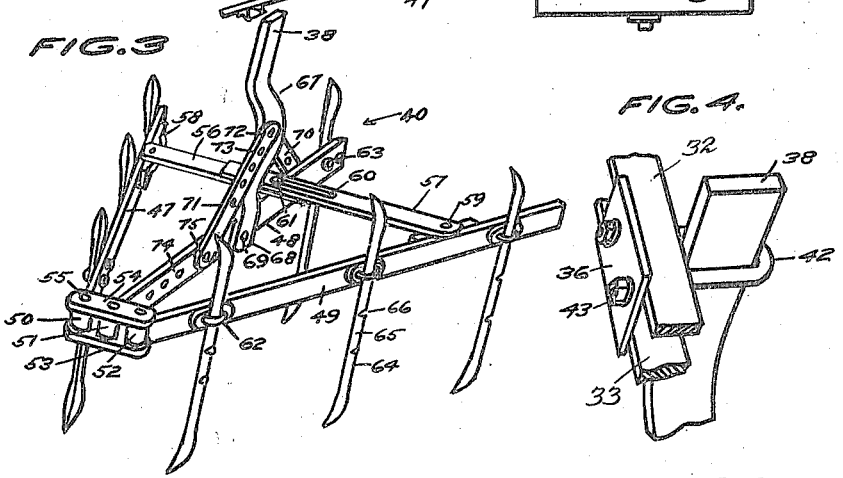
INVENTOR
GEORGE JEFFREY
BY Hazard and Miller
ATT'YS

UNITED STATES PATENT OFFICE.

GEORGE JEFFREY, OF IRVINE, CALIFORNIA.

FURROW-FILLER AND CULTIVATOR.

1,254,600.        Specification of Letters Patent.        Patented Jan. 22, 1918.

Application filed July 23, 1917. Serial No. 182,231.

*To all whom it may concern:*

Be it known that I, GEORGE JEFFREY, a citizen of the United States, residing at Irvine, in the county of Orange and State of California, have invented new and useful Improvements in Furrow-Fillers and Cultivators, of which the following is a specification.

My object is to provide a cultivator for general purposes and capable of many adjustments, and especially adapted for filling furrows, as in irrigated orchards and the like.

Figure 1 is a side elevation of a cultivator and furrow filler embodying the principles of my invention, as seen looking in the direction indicated by the arrow —1— in Fig. 2.

Fig. 2 is a top plan view as indicated by the arrow —2— in Fig. 1.

Fig. 3 is a perspective of one of the cultivator units removed from the carriage.

Fig. 4 is an enlarged fragmentary perspective showing the joint for mounting the cultivator units in the carriage.

The front axle 1 has traction wheels 2 and 3 upon its ends. The carriage frame bars 4 and 5 are mounted at their forward ends upon the axle 1, said bars extending backwardly in parallel positions to points beyond the cultivator units and then the portions 6 and 7 extend inwardly and backwardly to near the transverse center, and the portions 8 and 9 extend backwardly from the inner ends of the portions 6 and 7, and are fixed to the caster bearing 10. The caster 11 has a vertical stem 12 extending through the bearing 10 for supporting the rear end of the frame. A platform 13 is secured between the portions 8 and 9 and supports the driver's seat 14.

Bearing blocks 16 and 17 are mounted upon the extreme rear ends of the parallel portions of the bars 4 and 5, and a rock-shaft 18 is mounted in these bearings transversely of the machine. The hand-lever mechanism 19 is fixed upon the end of the shaft 18 and coöperates with the rack 20 fixed upon the frame to hold the rock-shaft 18 in an adjusted position. A crank-arm 21 is fixed upon the shaft 18 near the center and extends forwardly at an angle to the handle of the hand-lever mechanism 19.

Blocks 22 and 23 are fixed upon the axle 1 and equally spaced from the center. Lifting levers 24 and 25 are connected to the blocks 22 and 23 by pivot bolts 26 and 27 and extend backwardly parallel to each other and parallel to the side frames 4 and 5, and the rear ends of the levers 24 and 25 are rigidly connected by a bar 28. A post 29 is rigidly fixed at the center of the bar 28 and extends upwardly and has a series of transverse bolt holes 30. An adjusting bolt 31 is mounted through the forward end of the arm 21 and through a desired one of the bolt holes 30 so as to connect the lifting levers 24 and 25 to the hand-lever mechanism 19 so that the rear ends of the levers may be raised or lowered and held in adjusted position by manipulating the hand-lever.

Bars 32 and 33 are placed transversely of the levers 24 and 25, one bar below the levers and one bar on top, and said bars are adjustably clamped upon the levers by bolts 34, so that by loosening the bolts the bars may be moved forwardly or backwardly upon the levers. Clamping plates 35 and 36 are placed vertically against the front edges of the ends of the bars 32 and 33, and the shanks 37 and 38 of the cultivator units 39 and 40 are placed vertically against the rear edges of the bars, and U-bolts 41 and 42 are inserted straddle of the shanks between the bars, through the clamping plates, and nuts 43 placed upon the forward ends of the U-bolts so as to clamp the shanks rigidly in place.

Hounds 44 and 45 extend forwardly and inwardly from the blocks 22 and 23 and their forward ends are rigidly secured together and carry a clevis 46 for the reception of a swingle-tree or double-tree for pulling the cultivator.

The units 39 and 40 are duplicates and each unit is constructed as shown in detail in Fig. 3. The shovel bars 47, 48 and 49 are rectangular in cross-section and are vertically mounted edgewise. The foward ends of the bars have vertical bearings 50, 51 and 52, and hinge plates 53 and 54 are placed above and below the bearings and hinge pins 55 are inserted and fixed to hold the plates 53 and 54 together and to hold the bars pivotally connected at their forward ends. The adjusting bars 56 and 57 are connected at their outer ends to the bars 47 and 49 near their rear ends by pivots 58 and 59. The bars 56 and 57 overlap on top of the bar 48 and have corresponding longitudinal slots 60. A clamping bolt 61 extends upwardly through a bearing in the bar 48 and through the slots 60 and has a nut upon its upper end so that when the nut is loosened the rear ends of the bars 47 and 49 may be moved to or from the bar 48 and when the nut is tightened the bars are held in rigid relation to each other, as required to form an A-shaped cultivator frame.

U-bolt clamps 62 are located along the bars 47 and 49, preferably upon their outer sides, and a similar clamp 63 is located at the rear end of the bar 48. The cultivator shovels 64 have shanks 65 extending through the clamps 62 and the clamp 63 and notches 66 are distributed along the shanks to be engaged by the U-bolts so that the clamps may be loosened and the shanks may be moved up or down through the clamps and then the clamps tightened to hold the shanks rigidly in place relative to their bars. The shovels 64 are formed upon both ends of the shank 65 so that they may be reversed. If the unit is traveling straddle of the furrow, the shovels upon one bar will be set to face the shovels upon the other bar so as to throw the dirt inwardly to fill the furrow.

The upper end of the shank 38 is normally vertical. The intermediate portion 67 is an O G curve, and the lower portion 68 is inclined forwardly and backwardly from the central portion. The lower portion 68 is bifurcated to straddle the center of the bar 48, and a pivot pin 69 is fixed in place to hinge the shank to the bar. Adjustable braces 70 and 71 are pivoted to the bar 48 forwardly and backwardly of the pivot 69 and extend upwardly and are adjustably connected to the central portion 67 by a removable bolt 72, there being a series of bolt holes 73 in said braces and a series of bolt holes 74 in the bar 48. By removing the bolt 72 the shank 38 may be tipped forwardly or backwardly and the bolt reinserted through the proper hole to fix the shank in the desired adjusted position. This adjustment may also be varied by removing the bolts 75 at the lower ends of the braces and inserting them through the desired ones of the bolt holes 74. Adjusting the shanks 37 and 38 upon the cultivator frames serves to adjust the cultivator units relative to the carriage and the ground when the shanks are placed in the U-bolts 41 and 42 and clamped to the bars 32 and 33. I consider the shape of the shanks as shown and described important in effecting this adjustment of the cultivator units.

The operation is obvious.

The details of construction may be varied in many ways without departing from the spirit of my invention as set up in the following claims.

I claim:

1. In a cultivator, a front axle, a frame mounted at its front end upon the axle, a caster under the rear end of the frame, lifting levers pivoted in the frame at their forward ends and rigidly connected at their rear ends, a rock-shaft mounted transversely at the rear of the frame, a hand-lever mechanism for operating the rock-shaft, a crank-arm connecting the rock-shaft to the bar connecting the rear ends of the lifting levers, a bar construction mounted transversely upon the central portions of the lifting levers and adapted for adjustment longitudinally of the lifting levers, and cultivator units adjustably connected to the ends of the bar construction.

2. A cultivator unit comprising two side bars and a central longitudinal bar, shovels carried by the side bars, a shank pivotally connected to the center of the longitudinal bar, and diagonal braces connecting the central portion of the shank forwardly and backwardly to the bar and having a plurality of bolt holes so that the angle of the shank may be adjusted relative to the bar.

3. A cultivator comprising a carriage, a lifting lever pivotally mounted at the forward end of said carriage for vertical swinging movement, adjustable means for raising and lowering the rear end of the lifting lever, a pair of parallel bars secured transversely of the lifting lever, cultivator units adapted to be supported by the bars, and clamping means for securing said units in vertical and horizontal adjustment in relation to said bars.

4. A cultivator comprising a carriage, a lifting lever pivotally mounted at the forward end of said carriage for vertical swinging movement, adjustable means for raising and lowering the rear end of the lifting lever, a pair of parallel bars secured transversely of the lifting lever, cultivator units adapted to be supported by the bars, clamping means for securing said units in vertical and horizontal adjustment in relation to said bars, and means for separately and adjustably disposing the units at various angles to the horizontal.

In testimony whereof I have signed my name to this specification.

GEORGE JEFFREY.